United States Patent
Kern (10) Patent No.: US 11,733,514 B2
(45) Date of Patent: Aug. 22, 2023

(54) OPTICAL WAVEGUIDE FOR A DISPLAY DEVICE

(71) Applicant: CONTINENTAL AUTOMOTIVE GMBH, Hannover (DE)

(72) Inventor: Thorsten Alexander Kern, Hamburg (DE)

(73) Assignee: Continental Automotive GmbH, Hannover (DE)

(*) Notice: Subject to any disclaimer, the term of this patent is extended or adjusted under 35 U.S.C. 154(b) by 0 days.

(21) Appl. No.: 17/122,184

(22) Filed: Dec. 15, 2020

(65) Prior Publication Data
US 2021/0141224 A1    May 13, 2021

Related U.S. Application Data (63) Continuation of application No. PCT/EP2019/065511, filed on Jun. 13, 2019.

(30) Foreign Application Priority Data

Jun. 15, 2018 (DE) .................... 10 2018 209 638.4

(51) Int. Cl.
    *G02B 27/01*      (2006.01)
    *G02F 1/01*      (2006.01)

(52) U.S. Cl.
    CPC .......... *G02B 27/0103* (2013.01); *G02F 1/011* (2013.01); *G02B 2027/0105* (2013.01)

(58) Field of Classification Search
CPC ................ G02B 27/0103; G02B 27/01; G02B 2027/0107; G02B 2027/0105
See application file for complete search history.

(56) References Cited

U.S. PATENT DOCUMENTS

| | | |
|---|---|---|
| 6,580,529 B1 | 6/2003 | Amitai et al. |
| 2014/0300966 A1 | 10/2014 | Travers et al. |
| 2015/0260994 A1 | 9/2015 | Akutsu et al. |
| 2016/0124223 A1 | 5/2016 | Shinbo et al. |

FOREIGN PATENT DOCUMENTS

| | | |
|---|---|---|
| EP | 2751611 A1 | 7/2014 |
| JP | 2015152746 A | 8/2015 |
| JP | 2015175967 A | 10/2015 |

(Continued)

OTHER PUBLICATIONS

International Search Report and Written Opinion dated Sep. 20, 2019 from corresponding International Patent Application No. PCT/EP2019/065511.

(Continued)

*Primary Examiner* — Thomas A Hollweg
*Assistant Examiner* — Mary A El-Shammaa (57) ABSTRACT

The disclosure relates to an optical waveguide for a display device and to a method for controlling such an optical waveguide. The optical waveguide has a switchable input coupling hologram and an electrode for switching the switchable input coupling hologram. The electrode is designed as an electrode array having a pixel matrix. The pixels of the pixel matrix can be switched individually. For this purpose, the pixels can be connected to a voltage source. Controlling the pixels is performed by a control unit.

13 Claims, 5 Drawing Sheets

(56) References Cited

FOREIGN PATENT DOCUMENTS

| JP | 2017531840 | A | | 10/2017 | | |
|---|---|---|---|---|---|---|
| WO | WO-2013033274 | A1 | * | 3/2013 | ......... | G02B 27/0081 |
| WO | 2017060665 | A1 | | 4/2017 | | |

OTHER PUBLICATIONS

Notice of Reasons for Refusal (translated and original) dated Jan. 24, 2022 from corresponding Japanese patent application No. 2020-569821.

Notice of Reasons for Refusal, dated Jun. 24, 2022 from corresponding Japanese patent application No. 2020-569821.

Y.J. Liu et al. "Holographic Polymer-Dispersed Liquid Crystals: Materials, Formation, and Applications", Advances in OptoElectronics, 2008, pp. 1-52, vol. 2008, Article ID 684349, Hindawi Publishing Corporation (54 pages).

* cited by examiner

OPTICAL WAVEGUIDE FOR A DISPLAY DEVICE

CROSS-REFERENCE TO RELATED APPLICATIONS

This application claims the benefit of International Application PCT/EP2019/065511, filed Jun. 13, 2019, which claims priority to German Application DE 10 2018 209 638.4, filed Jun. 15, 2018. The disclosures of the above applications are incorporated herein by reference.

TECHNICAL FIELD

The disclosure relates to an optical waveguide for a display device and to a method for controlling such an optical waveguide. The disclosure also relates to a device for generating a virtual image using such an optical waveguide.

BACKGROUND

A head-up display, also referred to as a HUD, is understood to mean a display system in which the viewer can maintain their viewing direction, since the contents to be represented are superposed into their field of view. While such systems were originally primarily used in the aerospace sector due to their complexity and cost, they are now also being used in large-scale production in the automotive sector.

Head-up displays generally includes an image generator, an optics unit, and a mirror unit. The image generator produces the image. The optics unit directs the image onto the mirror unit. The image generator is often also referred to as an image-generating unit or PGU (Picture Generating Unit). The mirror unit is a partially reflective, light-transmissive pane. The viewer thus sees the contents represented by the image generator as a virtual image and at the same time sees the real world behind the pane. In the automotive sector, the windshield is often used as the mirror unit, and the curved shape of the windshield must be taken into account in the representation. Due to the interaction of the optics unit and the mirror unit, the virtual image is an enlarged representation of the image produced by the image generator.

The viewer can view the virtual image only from the position of what is known as the eyebox. A region whose height and width correspond to a theoretical viewing window is called an eyebox. As long as one eye of the viewer is within the eyebox, all elements of the virtual image are visible to that eye. If, on the other hand, the eye is outside the eyebox, the virtual image is only partially visible to the viewer, or not at all. The larger the eyebox is, the less restricted the viewer is in choosing their seating position.

The size of the virtual image of conventional head-up displays is limited by the size of the optics unit. One approach for enlarging the virtual image is to couple the light coming from the image-generating unit into an optical waveguide. The light that is coupled into the optical waveguide and carries the image information undergoes total internal reflection at the interfaces thereof and is thus guided within the optical waveguide. In addition, a portion of the light is in each case coupled out at a multiplicity of positions along the propagation direction, so that the image information is output distributed over the surface of the optical waveguide. Owing to the optical waveguide, the exit pupil is in this way expanded. The effective exit pupil is composed here of images of the aperture of the image generation system.

Against this background, US 2016/0124223 A1 describes a display apparatus for virtual images. The display apparatus includes an optical waveguide that causes light that is coming from an image-generating unit and is incident through a first light incidence surface to repeatedly undergo internal reflection in order to move in a first direction away from the first light incidence surface. The optical waveguide also has the effect that a portion of the light guided in the optical waveguide exits to the outside through regions of a first light exit surface that extends in the first direction. The display apparatus further includes a first light-incidence-side diffraction grating that diffracts incident light to cause the diffracted light to enter the optical waveguide, and a first light-emergent diffraction grating that diffracts the light that is incident from the optical waveguide.

In current head-up displays based on optical waveguides, holograms rather than simple gratings are used for input and output coupling. For this purpose, for example, holograms that are embedded in a birefringent liquid crystal layer are used. This liquid crystal layer is electrically switchable. A typical application for this is the surface-type switching on and off of the liquid crystal layer in order to synchronize the input coupling according to a sequentially operating light source for a plurality of colors when using a plurality of optical waveguides arranged one above the other.

Switchable volume holograms based on a birefringent liquid crystal layer can be produced, for example, using the photopolymerization of a mixture of suitable monomers with liquid crystal material. For this purpose, the mixture is introduced into a cell, which is formed by parallel glass plates or plastics substrates. An interference pattern is then produced in the cell by superposing two laser beams. The monomers polymerize faster in the light regions of the interference pattern than in the dark regions of the interference pattern. During the recording process, further monomers then diffuse into the light regions and form further polymers. At the same time, further liquid crystals diffuse into the dark regions and form microdroplets there, also called LC droplets. In this way, a phase separation occurs in the form of regions that have a multiplicity of such liquid crystal droplets and regions in which polymers are substantially present. These alternating regions then form a lattice structure in the liquid crystal layer in the form of a modulated refractive index profile at which incident light can be diffracted.

Transparent electrodes can be attached to the glass plates or substrates of the cell, for example in the form of an ITO layer (ITO: indium tin oxide), in order to be able to apply an electrical field across the liquid crystal layer and thus to influence the diffraction behavior. In this case, the orientation of the liquid crystals in the liquid crystal droplets changes, as a result of which the refractive index modulation of the stripes is reduced and, with a suitable electrical field or suitable materials, even disappears completely owing to index adaptation between liquid crystals and polymers. This then has the consequence that the incident light is not deflected. Due to the small size of the liquid crystal droplets, short switching times can be achieved here. Additional details relating to the use of liquid crystal droplets for holographic applications can be found in Y J Liu et al.: "*Holographic Polymer-Dispersed Liquid Crystals: Materials, Formation, and Applications*", Advances in OptoElectronics, Volume 2008, Article ID 684349.

Due to the special form of light guidance, existing systems based on optical waveguides are not optimal in terms of their contrast behavior. In particular, the case may arise that light that is coupled in as scattered light coming from the image-generating unit at unfavorable angles is guided in the optical waveguide and is then coupled out in an uncontrolled manner into undesired angular regions.

SUMMARY

The disclosure provides an improved optical waveguide and a method for controlling such an optical waveguide, which permit improvement of contrast behavior.

According to a first aspect of the disclosure, an optical waveguide for a display device has: a switchable input coupling hologram; and an electrode for switching the switchable input coupling hologram, where the electrode is designed as an electrode array.

According to a further aspect of the disclosure, in a method for controlling an optical waveguide for a display device by a control unit, an electrode array of an input coupling hologram of the optical waveguide is controlled in such a way that regions in which no light is coupled into the optical waveguide are realized.

In the solution according to the disclosure, the use of a switchable input coupling hologram in combination with an electrode array instead of a simple electrode makes it possible to prevent the coupling of light in partial regions of the input coupling hologram. Since no scattered light can be coupled into the optical waveguide in these inactive regions, the amount of scattered light coupled in overall is minimized. The inactive regions can be defined in a way such that the image reproduction by the display device is not disturbed. A control unit may be provided for controlling the electrode array.

According to another aspect of the disclosure, the electrode array has a pixel structure, the pixels of which are switchable via a voltage source. The pixel structure makes it possible to define the regions in which no light is coupled into the optical waveguide very precisely within the framework of the pixel resolution.

According to another aspect of the disclosure, the switching of a pixel allows an active layer of the optical waveguide to couple light into the optical waveguide at a position of the input coupling hologram that is assigned to the pixel. Since an active layer is often already present, the solution according to the disclosure can be implemented by using that layer with only a few additional elements and thus cost-effectively. Two variants can be implemented here. In a first variant, the light can be coupled in where there is no voltage. In a second variant, a voltage must be applied in order to couple in the light.

According to another aspect of the disclosure, the active layer of the optical waveguide has liquid crystal droplets. Liquid crystal droplets of this type are already currently being used in optical waveguides for head-up displays, and the solution according to the disclosure can therefore be implemented in supplementary fashion without major modifications being required. In addition, liquid crystal droplets can be controlled very specifically by applying a voltage.

According to yet another aspect of the disclosure, the regions in which no light is coupled into the optical waveguide coincide with regions of an image to be displayed in which no image contents to be displayed are located. Since no light has to be coupled in any way for the representation of image contents in these regions, these inactive regions have no disruptive effects on the image representation.

According to a further aspect of the disclosure, a device for generating a virtual image has: an image-generating unit for producing an image; and an optics unit for projecting the image onto a mirror unit for generating the virtual image, where the optics unit has at least one optical waveguide according to the disclosure.

The optical waveguide according to the disclosure makes it possible to implement head-up displays with an improved contrast behavior. The use is therefore advantageous in head-up displays that are used in an environment that requires high contrast. This is the case, for example, when used in a motor vehicle.

A device according to the disclosure for generating a virtual image may be used in a means of transport in order to produce a virtual image for an operator of the means of transport. The means of transport can be, for example, a motor vehicle or an aircraft. Of course, the solution according to the disclosure can also be used in other environments or for other applications, e.g. in trucks, in rail technology, and in public transport, in cranes and construction machinery, etc.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Initially, the basic concept of a head-up display with an optical waveguide will be explained with reference to FIGS. 1 to 4.

Figure 1:
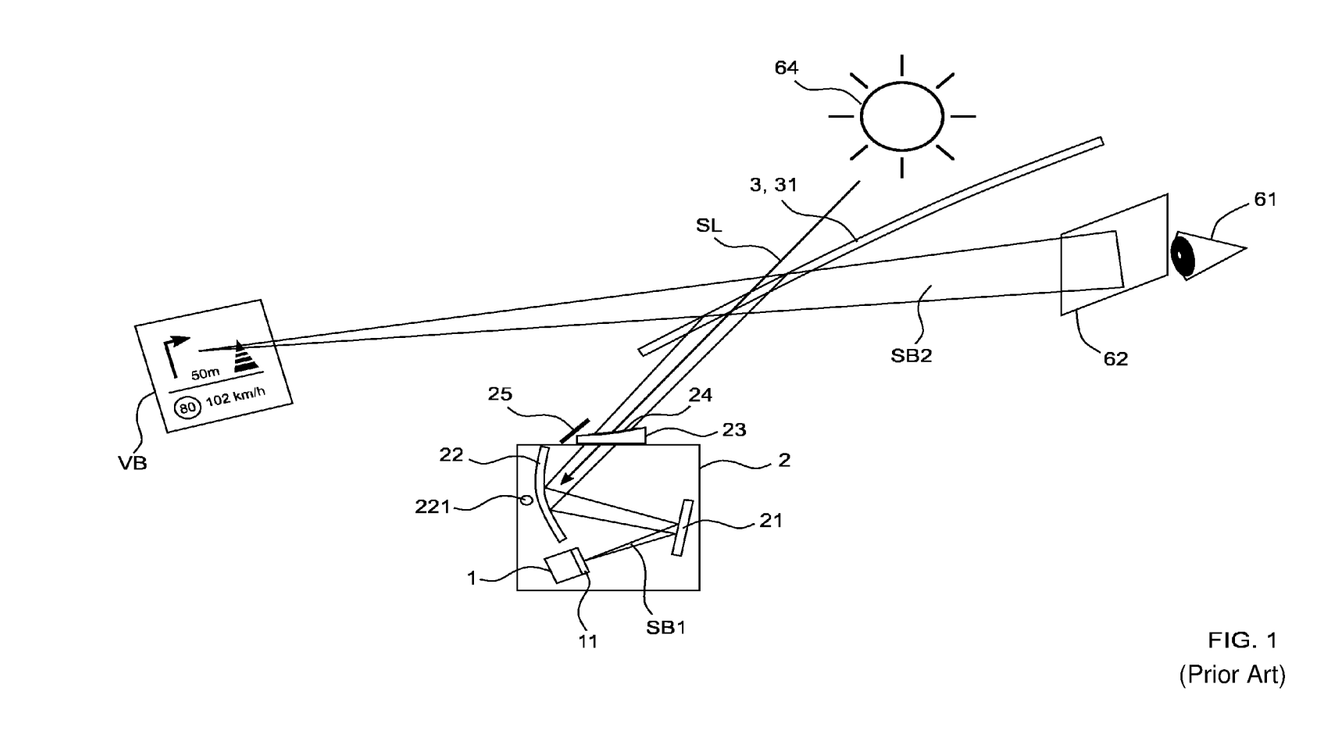
FIG. 1 schematically shows a head-up display according to the prior art for a motor vehicle.

FIG. 1 shows a schematic diagram of a head-up display according to the prior art for a motor vehicle. The head-up display has an image generator 1, an optics unit 2, and a mirror unit 3. A beam bundle SB1 emanates from a display element 11 and is reflected by a folding mirror 21 onto a curved mirror 22 that reflects it in the direction of the mirror unit 3. The mirror unit 3 is illustrated here as a windshield 31 of a motor vehicle. From there, the beam bundle SB2 travels in the direction of an eye 61 of a viewer.

The viewer sees a virtual image VB that is located outside the motor vehicle above the engine hood or even in front of the motor vehicle. Due to the interaction of the optics unit 2 and the mirror unit 3, the virtual image VB is an enlarged representation of the image displayed by the display element 11. A speed limit, the current vehicle speed, and navigation instructions are symbolically represented here. As long as the eye 61 is located within the eyebox 62 indicated by a rectangle, all elements of the virtual image are visible to that eye 61. If the eye 61 is outside the eyebox 62, the virtual image VB is only partially visible to the viewer, or not at all. The larger the eyebox 62 is, the less restricted the viewer is when choosing their seating position.

The curvature of the curved mirror 22 is adapted to the curvature of the windshield 31 and ensures that the image distortion is stable over the entire eyebox 62. The curved mirror 22 is rotatably mounted by a bearing 221. The rotation of the curved mirror 22 that is made possible thereby makes it possible to displace the eyebox 62 and thus to adapt the position of the eyebox 62 to the position of the eye 61. The folding mirror 21 serves to ensure that the path traveled by the beam bundle SB1 between the display element 11 and the curved mirror 22 is long and, at the same time, that the optics unit 2 is nevertheless compact. The optics unit 2 is delimited with respect to the environment by a transparent cover 23. The optical elements of the optics unit 2 are thus protected for example against dust located in the interior of the vehicle. An optical film or a polarizer 24 is furthermore located on the cover 23. The display element 11 is typically polarized, and the mirror unit 3 acts like an analyzer. The purpose of the polarizer 24 is therefore to influence the polarization in order to achieve uniform visibility of the useful light. An anti-glare protection 25 serves to reliably absorb the light reflected via the interface of the cover 23 so that the observer is not dazzled. In addition to the sunlight SL, the light from another stray light source 64 can also reach the display element 11. In combination with a polarization filter, the polarizer 24 can additionally be used to block out incident sunlight SL.

Figure 2:
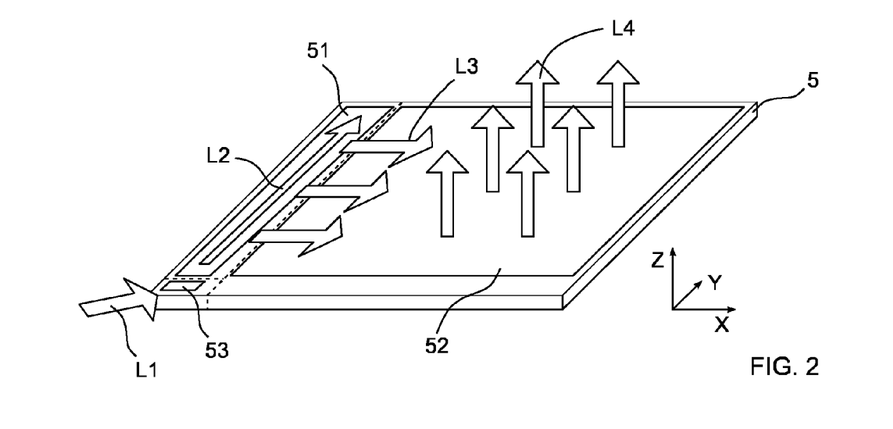
FIG. 2 shows an optical waveguide with two-dimensional enlargement.

FIG. 2 shows a schematic spatial illustration of an optical waveguide 5 with two-dimensional enlargement. In the lower left region, an input coupling hologram 53 can be seen, by means of which light L1 coming from an image-generating unit (not shown) is coupled into the optical waveguide 5. The light propagates therein in the drawing to the top right, according to the arrow L2. In this region of the optical waveguide 5, a folding hologram 51 that acts similarly to many partially transmissive mirrors arranged one behind the other and produces a light bundle that is expanded in the Y-direction and propagates in the X-direction is located. This is indicated by three arrows L3. In the part of the optical waveguide 5 that extends to the right in the figure, an output coupling hologram 52 is located, which likewise acts similarly to many partially transmissive mirrors arranged one behind the other and, indicated by arrows L4, couples light upward in the Z-direction out of the optical waveguide 5. In this case, an expansion takes place in the X-direction, so that the original incident light bundle L1 leaves the optical waveguide 5 as a light bundle L4 that is enlarged in two dimensions.

Figure 3:
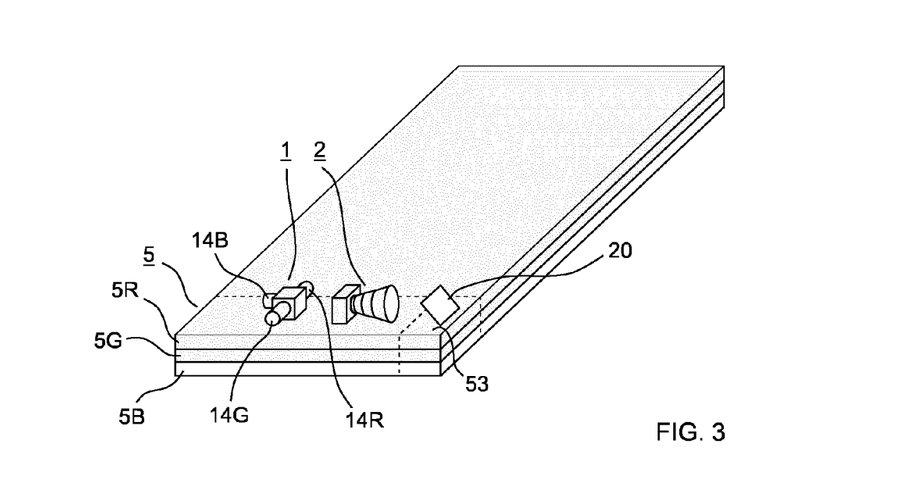
FIG. 3 schematically shows a head-up display with an optical waveguide.

FIG. 3 shows a three-dimensional illustration of a head-up display with three optical waveguides 5R, 5G, 5B, which are arranged one above the other and each stand for an elementary color red, green, and blue. Together they form the optical waveguide 5. The holograms 51, 52, 53 present in the optical waveguide 5 are each wavelength-dependent, meaning that one optical waveguide 5R, 5G, 5B is used in each case for one of the elementary colors. An image generator 1 and an optics unit 2 are shown above the optical waveguide 5. The optics unit 2 has a mirror 20, by means of which the light produced by the image generator 1 and shaped by the optics unit 2 is deflected in the direction of the respective input coupling hologram 53. The image generator 1 has three light sources 14R, 14G, 14B for the three elementary colors. It can be seen that the entire unit shown has a small overall structural height compared to its light-emitting surface.

Figure 4:
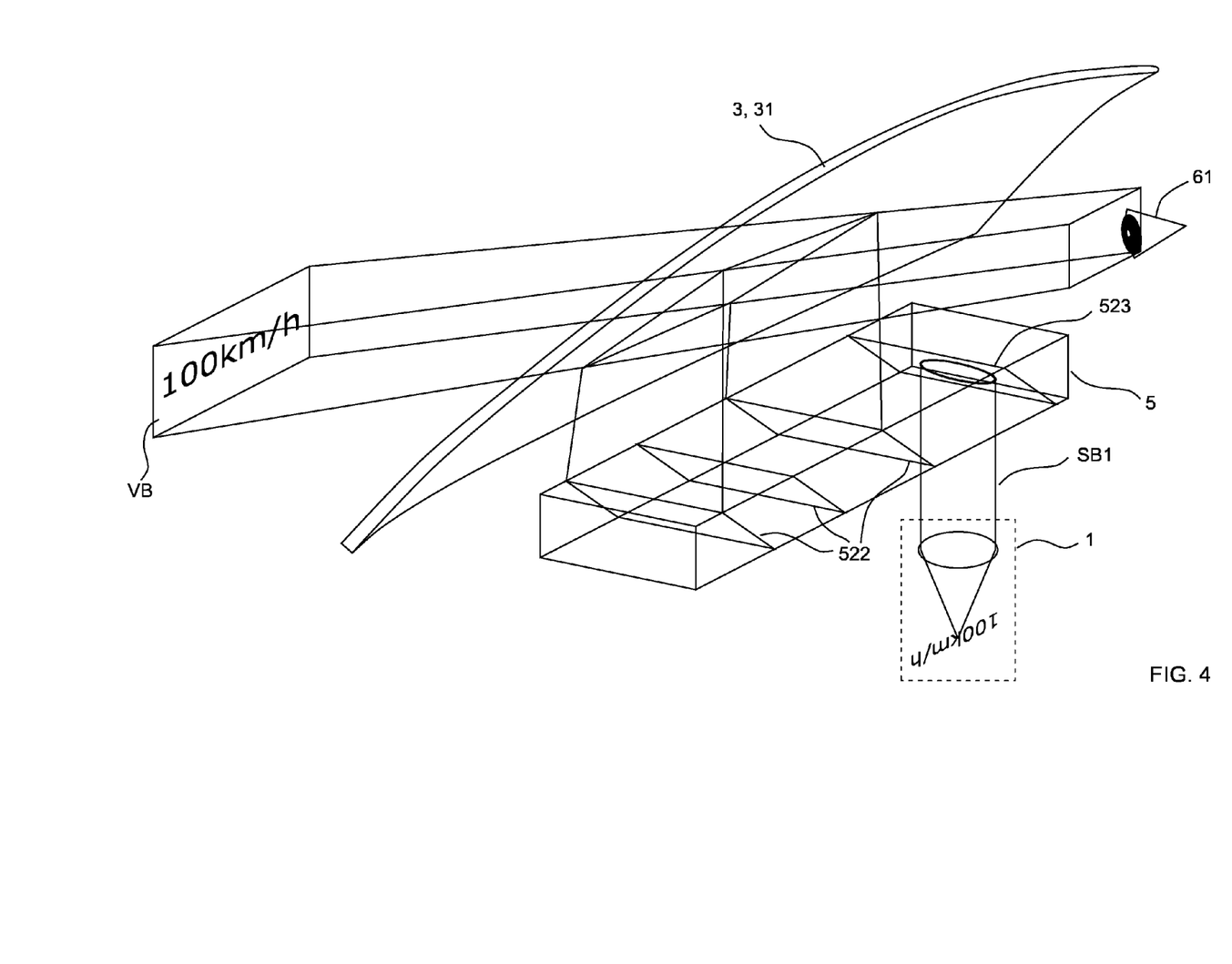
FIG. 4 schematically shows a head-up display with an optical waveguide in a motor vehicle.

FIG. 4 shows a head-up display in a motor vehicle similar to FIG. 1, except here in a three-dimensional illustration and with an optical waveguide 5. It shows the schematically indicated image generator 1, which produces a parallel beam bundle SB1 that is coupled into the optical waveguide 5 by the mirror plane 523. The optics unit is not shown for the sake of simplicity. A plurality of mirror planes 522 each reflect a portion of the light incident on them in the direction of the windshield 31, the mirror unit 3. The light is reflected thereby in the direction of the eye 61. The viewer sees a virtual image VB above the engine hood or at an even farther distance in front of the motor vehicle. With this technology, too, the entire optical unit is incorporated in a housing that is separated with respect to the environment by a transparent cover. As with the head-up display from FIG. 1, a retarder can be arranged on this cover.

Figure 5:
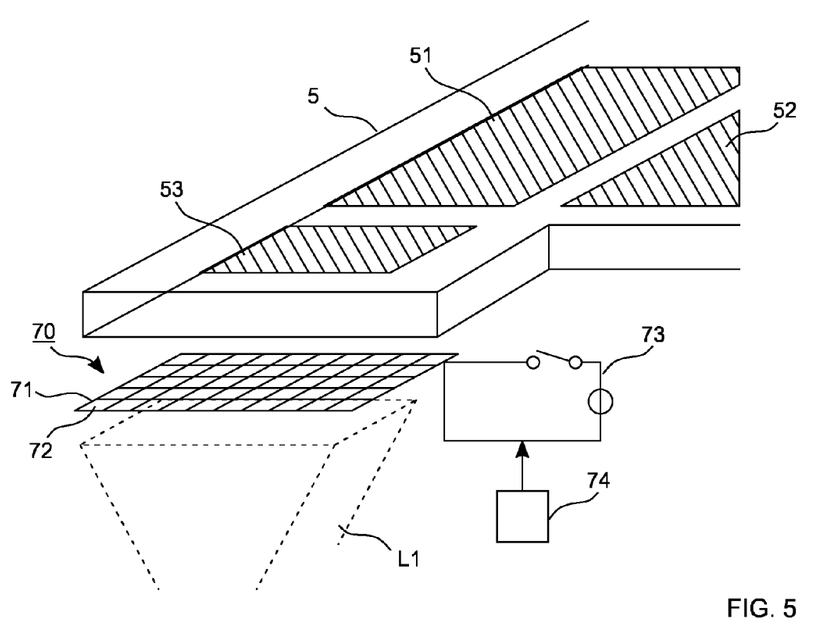
FIG. 5 shows an optical waveguide according to the disclosure with an electrode array.

FIG. 5 shows an optical waveguide 5 according to the disclosure with an input coupling hologram 53, a folding hologram 51, and an output coupling hologram 52. The input coupling hologram 53 is provided with an electrode array 70. The electrode array 70 has a pixel matrix 71 and can be implemented, for example, in the form of a structured ITO layer with transistors on a glass substrate. The pixels 72 of the pixel matrix 71 can be switched individually. For this purpose, the pixels 72 can be connected to a voltage source 73 such that they produce a voltage with respect to the input coupling hologram 53 of the optical waveguide 5. Controlling the pixels 72 is performed by a control unit 74. By switching the pixels 72, liquid crystal droplets of the input coupling hologram 53 located in the active layer of the optical waveguide 5 are enabled to couple the incident light L1 into an active part of the optical waveguide 5, that is to say to deflect or diffract it. Two variants can be implemented here. In a first variant, the light L1 can be coupled in where there is no voltage. In a second variant, a voltage must be applied in order to couple in the light L1.

Figure 6:
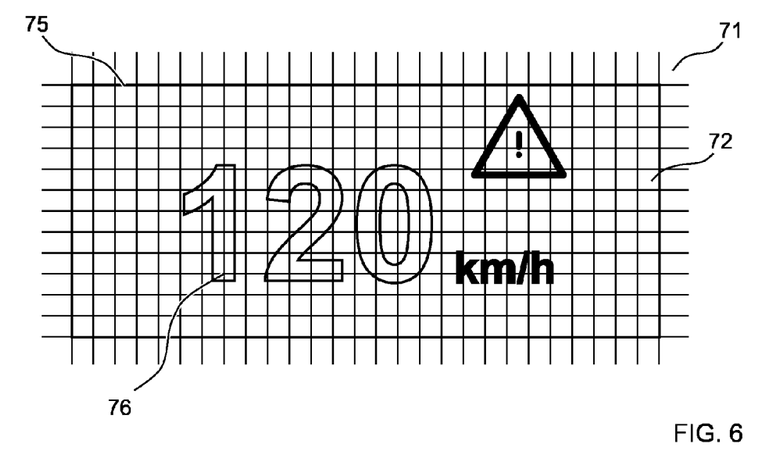
FIG. 6 schematically shows an image to be displayed in relation to a pixel matrix of the electrode array.

FIG. 6 schematically shows an image 75 to be displayed in relation to the pixel matrix 71 of the electrode array. It can be clearly seen here that image contents 76 to be displayed are actually present only in a relatively small part of the image 75 to be displayed. In the example shown, these are the speed specification "120" with the associated unit of measurement "km/h" and a warning sign.

Figure 7:
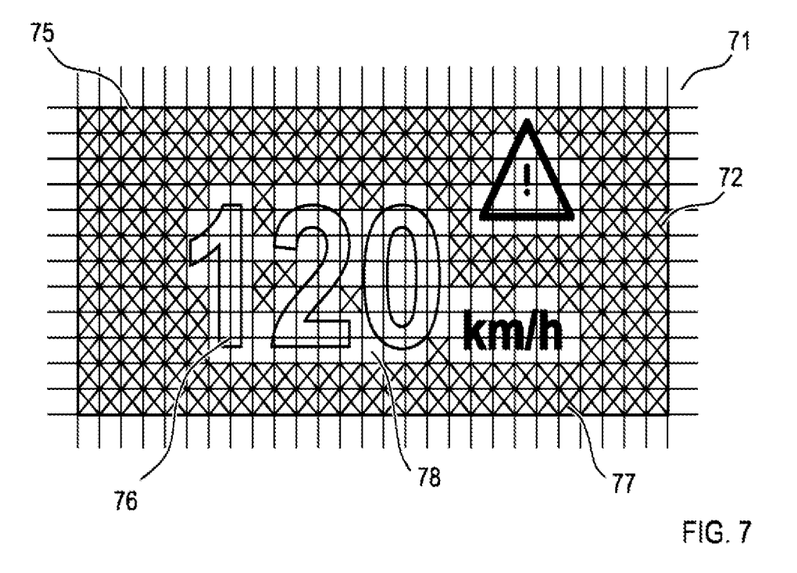
FIG. 7 shows schematically inactive regions and active regions realized by the pixel matrix of the electrode array.

FIG. 7 schematically shows inactive regions 77 and active regions 78 realized by the pixel matrix 71 of the electrode array. Inactive regions 77 in which no light is coupled into the optical waveguide are defined by applying or removing electrical voltage to or from individual pixels 72 of the pixel matrix 71. Active regions 78 in which light is coupled into the optical waveguide are likewise realized. The pixels 72 of the pixel matrix 71 are switched here in such a way that a spatial assignment of the active regions 78 to the image contents 76 to be represented of the image 75 to be displayed is realized. Since scattered light can only be coupled into the optical waveguide in the active regions 78, this measure reduces the total amount of the scattered light that is coupled in. Within the framework of the pixel resolution of the pixel matrix 71, the boundaries of the inactive regions 77 or the active regions 78 in FIG. 7 exactly follow the contours of the image contents 76 to be represented. However, provision may also be made that these boundaries are defined by bounding frames, also known as bounding boxes. These bounding frames can enclose the individual image contents 76 to be represented, groups of image contents 76 to be represented, or the entirety of the image contents 76 to be represented.

Figure 8:
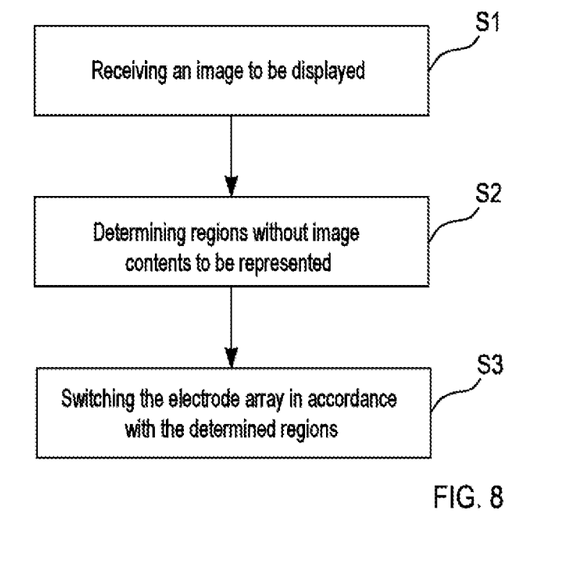
FIG. 8 schematically shows a method for controlling the optical waveguide from FIG. 5.

FIG. 8 schematically shows a method for controlling the optical waveguide from FIG. 5. The method can be performed, for example, by the control unit shown in FIG. 5. Alternatively, a processor of the image-generating unit can also be used for this purpose, which processor then outputs corresponding instructions to the control unit. In a first step, an image to be displayed is received S1. Regions of the image to be displayed in which there are no image contents to be represented are then determined S2. The electrode array of the optical waveguide is subsequently switched S3 in accordance with the determined regions, that is to say pixels of the pixel matrix of the electrode array are activated or deactivated in a targeted manner.

A number of implementations have been described. Nevertheless, it will be understood that various modifications may be made without departing from the spirit and scope of the disclosure. Accordingly, other implementations are within the scope of the following claims.

LIST OF REFERENCE SIGNS

1 Image generator/image-generating unit
11 Display element
14, 14R, 14G, 14B Light source
2 Optics unit
20 Mirror
21 Folding mirror
22 Curved mirror
221 Bearing
23 Transparent cover
24 Optical film/polarizer
25 Anti-glare protection
3 Mirror unit
31 Windshield
5 Optical waveguide
51 Folding hologram
52 Output coupling hologram
522 Mirror plane
523 Mirror plane
53 Input coupling hologram
54 Substrate
55 Top layer
56 Hologram layer
61 Eye/viewer
62 Eyebox
64 Stray light source
70 Electrode array
71 Pixel matrix
72 Pixels
73 Voltage source
74 control unit
75 Image to be displayed
76 Image content to be represented
77 Inactive region
78 Active region
L1 . . . L4 Light
S1 Receiving an image to be displayed
S2 Determining regions without image contents to be represented
S3 Switching the electrode array according to the specific regions
SB1, SB2 Beam bundles
SL Sunlight
VB Virtual image

What is claimed is:

1. A method for controlling an optical waveguide for a display device, the method comprising:
controlling an electrode array by a control unit for switching a switchable input coupling hologram of the optical waveguide in such a way that regions in which no light is coupled into the optical waveguide are realized,
wherein the regions in which no light is coupled into the optical waveguide coincide with regions of an image to be displayed in which there are no image contents produced by an image-generating unit.

2. The method as claimed in claim 1, wherein the electrode array has a pixel structure, the pixels of which are switched via a voltage source.

3. The method as claimed in claim 2, wherein the switching of a pixel allows an active layer of the optical waveguide to couple light into the optical waveguide at a position of the input coupling hologram assigned to the pixel.

4. The method as claimed in claim 3, wherein the active layer of the optical waveguide has liquid crystal droplets.

5. A device for generating a virtual image, the device comprising:
an image-generating unit for producing an image;
an optics unit for projecting the image onto a mirror unit for generating the virtual image;
an optical waveguide for expanding an exit pupil having a switchable input coupling hologram;
an electrode array for switching the switchable input coupling hologram; and
a control unit configured to control the electrode array such that regions in which no light is coupled into the optical waveguide are realized, wherein the regions in which no light is coupled into the optical waveguide coincide with regions of an image to be displayed in which there are no image contents produced by an image-generating unit.

6. The device as claimed in claim 5, wherein the electrode array has a pixel structure, the pixels of which are switchable via a voltage source.

7. The device as claimed in claim 6, wherein the switching of a pixel allows an active layer of the optical waveguide to couple light into the optical waveguide at a position of the input coupling hologram assigned to the pixel.

8. The device as claimed in claim 7, wherein the active layer of the optical waveguide has liquid crystal droplets.

9. A vehicle with a device for generating a virtual image for an operator of the vehicle, the device comprising:
an image-generating unit for producing an image;
an optics unit for projecting the image onto a mirror unit for generating the virtual image;
an optical waveguide for expanding an exit pupil having a switchable input coupling hologram;
an electrode array for switching the switchable input coupling hologram; and
a control unit configured to control the electrode array such that regions in which no light is coupled into the optical waveguide are realized, wherein the regions in which no light is coupled into the optical waveguide coincide with regions of an image to be displayed in which there are no image contents produced by an image-generating unit.

10. The vehicle as claimed in claim 9, wherein the electrode array has a pixel structure, the pixels of which are switchable via a voltage source.

11. The vehicle as claimed in claim 10, wherein the switching of a pixel allows an active layer of the optical waveguide to couple light into the optical waveguide at a position of the input coupling hologram assigned to the pixel.

12. The vehicle as claimed in claim 11, wherein the active layer of the optical waveguide has liquid crystal droplets.

13. The vehicle as claimed in claim 9, wherein the vehicle is a motor vehicle or an aircraft.

\* \* \* \* \*